United States Patent
Faulkner et al.

(10) Patent No.: US 12,275,293 B2
(45) Date of Patent: Apr. 15, 2025

(54) VEHICLE DOOR LUBRICANT APPLICATION SYSTEMS AND METHODS OF APPLYING LUBRICANT TO VEHICLE DOORS

(71) Applicant: Toyota Motor Engineering & Manufacturing North America, Inc., Plano, TX (US)

(72) Inventors: Michael J. Faulkner, Stanton, KY (US); Jarett M. McGeorge, Georgetown, KY (US); Aquiles N. Elgueta, Winchester, KY (US); Logan H. Coomer, Berea, KY (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/222,800

(22) Filed: Jul. 17, 2023

(65) Prior Publication Data

US 2025/0026186 A1    Jan. 23, 2025

(51) Int. Cl.
*B60J 5/04* (2006.01)
*F16N 7/36* (2006.01)
*F16N 15/04* (2006.01)

(52) U.S. Cl.
CPC .............. *B60J 5/0463* (2013.01); *F16N 7/36* (2013.01); *F16N 15/04* (2013.01); *F16N 2210/04* (2013.01)

(58) Field of Classification Search
CPC ... F16N 31/00; F16N 7/34; F16N 7/36; F16N 15/04; F16N 2210/04; B60J 5/0463

USPC .............................................. 184/6
See application file for complete search history.

(56) References Cited

U.S. PATENT DOCUMENTS

| | | | | |
|---|---|---|---|---|
| 2,173,654 A * | 9/1939 | Moore | ..................... | B61K 3/00 184/3.1 |
| 2,207,452 A * | 7/1940 | Bingman | ................ | D06F 43/06 134/107 |
| 2,579,575 A * | 12/1951 | Herdlein | ................. | B08B 3/022 134/131 |
| 3,047,912 A * | 8/1962 | Sobolewski | ............ | E06B 5/003 160/90 |
| 3,155,191 A * | 11/1964 | Nelson | ................... | B61K 11/00 184/2 |
| 4,662,115 A * | 5/1987 | Ohya | ..................... | B60J 5/0481 49/502 |
| 5,078,089 A * | 1/1992 | Dugan | .................... | B05B 16/95 118/316 |

(Continued)

FOREIGN PATENT DOCUMENTS

| CN | 104089784 A | 10/2014 |
|---|---|---|
| CN | 204307751 U | 5/2015 |

(Continued)

*Primary Examiner* — Henry Y Liu
(74) *Attorney, Agent, or Firm* — Dinsmore & Shohl LLP

(57) ABSTRACT

A vehicle door lubricant application system includes a pump connected to a fluid line that is connected to a fluid reservoir. The pump is configured to provide a preselected amount of a lubricant to a spray nozzle assembly. The spray nozzle assembly is configured to dispense the lubricant. A sensing device is configured to detect presence of a vehicle door. The sensing device is configured to provide a signal in response to the presence of the vehicle door that is used to activate the pump.

11 Claims, 6 Drawing Sheets

(56) References Cited

U.S. PATENT DOCUMENTS

| | | | | |
|---|---|---|---|---|
| 8,689,941 B2* | 4/2014 | Eggleston | ............... | F16N 31/00 |
| | | | | 184/26 |
| 2009/0106941 A1* | 4/2009 | Greenbank | ............... | E05D 3/10 |
| | | | | 16/371 |
| 2011/0067311 A1* | 3/2011 | Corden | ................. | E05F 11/382 |
| | | | | 184/14 |
| 2012/0231172 A1* | 9/2012 | Eggleston | ............... | F16N 31/00 |
| | | | | 184/26 |
| 2019/0270112 A1* | 9/2019 | Hillman | .................. | B05C 1/027 |
| 2021/0129637 A1* | 5/2021 | Gardynik | ............... | B60J 5/0413 |

FOREIGN PATENT DOCUMENTS

| | | |
|---|---|---|
| CN | 209238236 U | 8/2019 |
| CN | 217289013 U | 8/2022 |
| EP | 2216226 B1 | 3/2014 |

\* cited by examiner

VEHICLE DOOR LUBRICANT APPLICATION SYSTEMS AND METHODS OF APPLYING LUBRICANT TO VEHICLE DOORS

TECHNICAL FIELD

The present specification generally relates to vehicle door lubricant application systems and methods of applying lubricant to vehicle doors in assembly processes.

BACKGROUND

Assembly lines in a manufacturing process use a plurality of machines, tools, and technicians, which operate to assemble a manufacturing article, such as a vehicle, with efficiency and precision. In a process of assembling a door to a vehicle, a lubricant may be applied to the door weather strips manually. Manual application of the lubricant can be time-consuming.

Accordingly, there is a need for applying lubricant automatically using a vehicle door lubricant application system and methods for applying lubricant to vehicle doors.

SUMMARY

In one or more embodiments, a vehicle door lubricant application system includes a pump connected to a fluid line that is connected to a fluid reservoir. The pump is configured to provide a preselected amount of a lubricant to a spray nozzle assembly. The spray nozzle assembly is configured to dispense the lubricant. A sensing device is configured to detect presence of a vehicle door. The sensing device is configured to provide a signal in response to the presence of the vehicle door that is used to activate the pump.

In one or more embodiments, a method of providing lubricant automatically to a vehicle door is provided. The method includes conveying the vehicle door toward a sensing device using a conveyor. The presence of the vehicle door is sensed using a sensing device. The sensing device provides a signal to a timing device upon detecting the presence of the vehicle door. Upon receipt of the signal, the timing device activates a pump. The pump provides the lubricant to a spray nozzle assembly during activation of the pump. The spray nozzle assembly sprays the lubricant onto the vehicle door.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
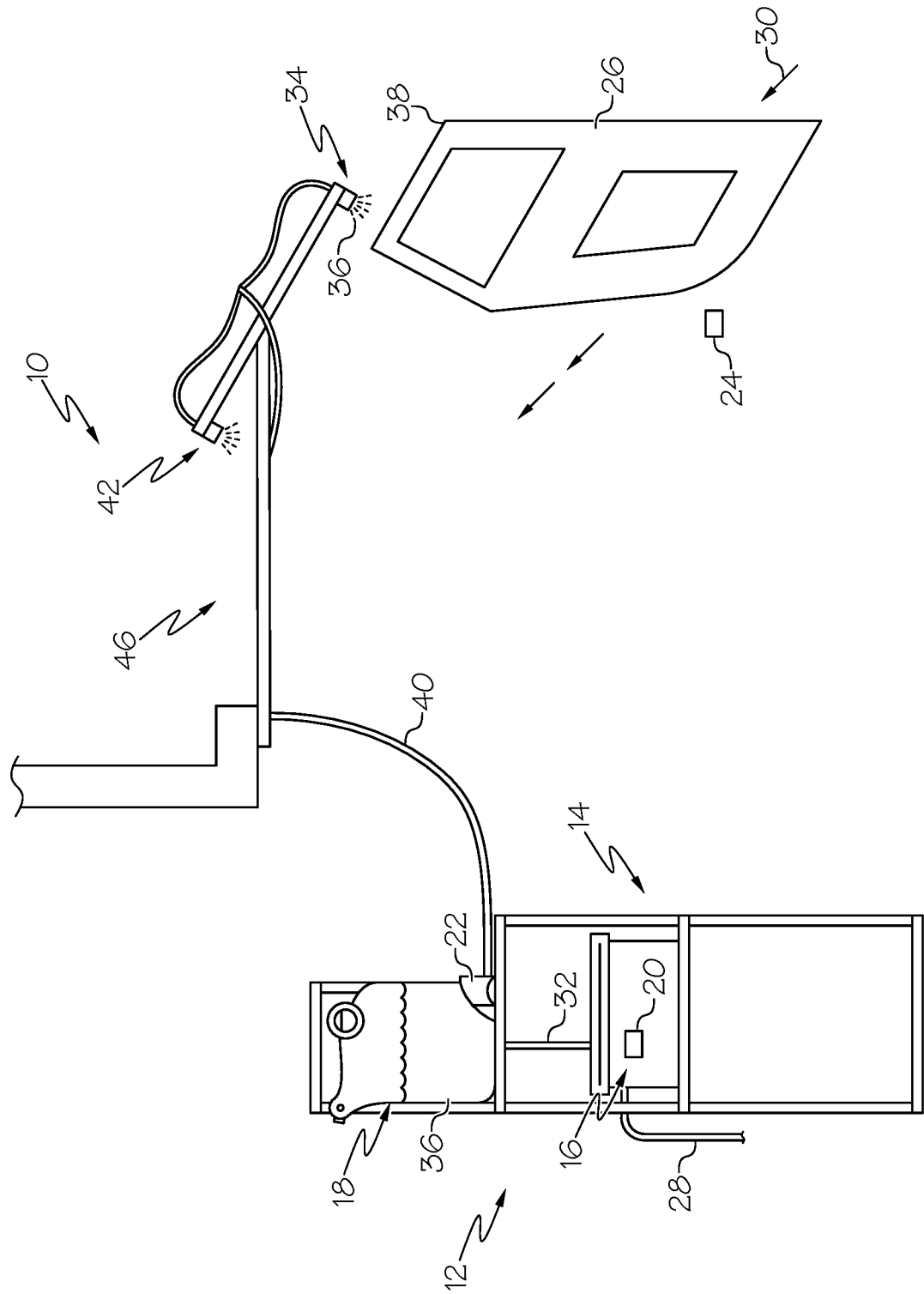
FIG. 1 schematically depicts a vehicle door lubrication system, according to one or more embodiments shown and described herein.
Figure 2:
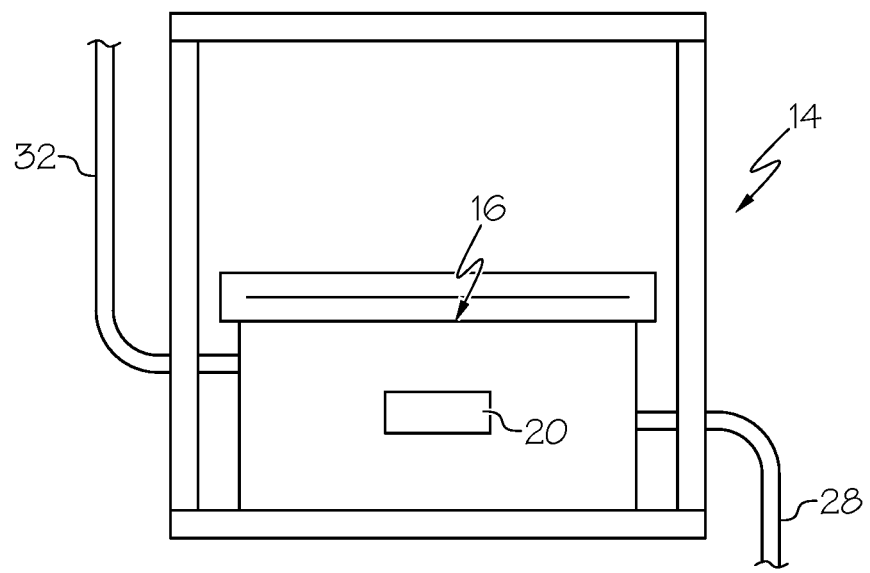
FIG. 2 schematically depicts a timing device for use in the vehicle door lubrication system, according to one or more embodiments shown and described herein.
Figure 3:
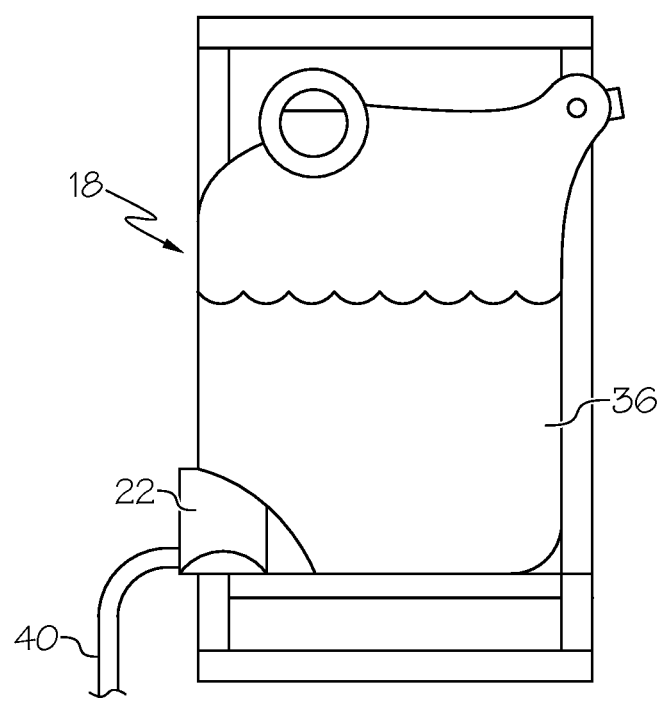
FIG. 3 schematically depicts a lubrication tank for use in the vehicle door lubrication system of FIG. 1, according to one or more embodiments shown and described herein.
Figure 4:
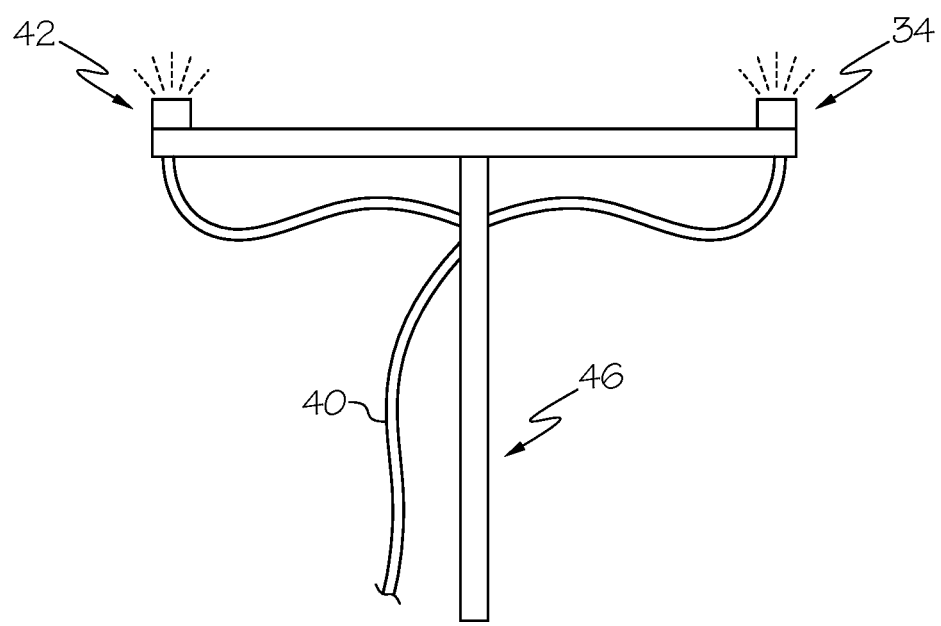
FIG. 4 schematically illustrates a spray nozzle assembly for use in the vehicle door lubrication system of FIG. 1, according to one or more embodiments shown and described herein.

Embodiments described herein are directed to vehicle door lubrication systems and methods of applying lubricant to vehicle doors. The vehicle door lubricant application systems include a pump connected to a fluid line that is connected to a fluid reservoir. The pump is configured to provide a preselected amount of a lubricant to a nozzle. The nozzle may be configured to dispense the lubricant as a spray. A sensing device, such as a limit switch, is configured to detect presence of a vehicle door. The sensing device is configured to provide a signal in response to the presence of the vehicle door that is used to activate the pump. In some embodiments, the sensing device may provide the signal to the pump and the pump, itself, can activate based on the signal. In some embodiments, the sensing device may provide the signal to a timing controller, which then instructs the pump to activate for a preselected period of time.

Referring to FIGS. 1-5, a vehicle door lubrication system 10 (FIG. 1) includes a control system 12 that includes a support frame 14 that supports a timing device 16 (FIG. 2) and a lubricant tank 18 (FIG. 3) thereon. The timing device 16 includes a timing controller 20 that is configured activate a pump 22 for a preselected period of time (e.g., two seconds or less, such as one second or less). The timing device 16 may be connected to a power source by power line 28 and may activate the pump 22 based on a signal from a sensing device 24 (e.g., a proximity or contact sensor, such as a limit switch) when a vehicle door 26 contacts or comes into a predetermined distance of the sensing device 24. For example, the vehicle door 26 may be conveyed to the vehicle door lubrication system 10 using a conveyor, represented by arrow 30, which carries the vehicle door 26 automatically to the sensing device 24. The sensing device 24 is operatively connected to the timing device 16 (e.g., through a wireless connection) so that the sensing device 24 provides a signal to the timing device 16 when the vehicle door 26 comes into contact with or in proximity to the sensing device 24. The timing controller 20 then activates the sprayer pump 22 (e.g., using power line 32) for the predetermined period of time. A spray nozzle assembly 34 then directs lubricant 36 toward the vehicle door 26, such as on a door weather strip or glass run channel, represented by element 38.

Figure 5:
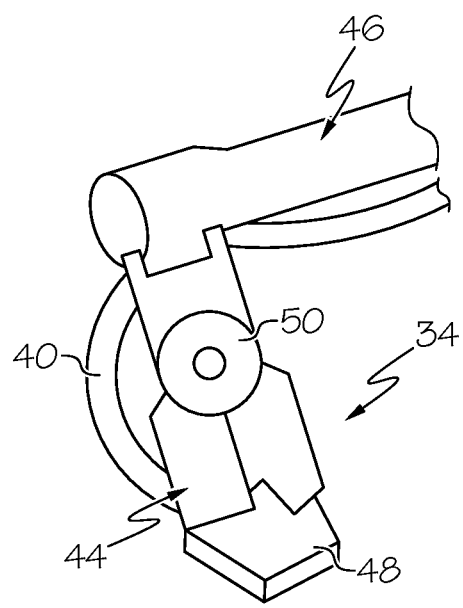
FIG. 5 schematically illustrates a spray nozzle assembly of FIG. 4, according to one or more embodiments shown and described herein.

The lubricant 36 may be provided by the lubricant tank 18 that is supported by the support frame 14. The lubricant 36 may be any suitable material, such as water, soap and water mixture, oil, etc. The pump 22 may be operatively connected to the lubricant tank 18 in order to pump the lubricant 36 from the lubricant tank 18 and into fluid line 40 that is operatively connected to the spray nozzle assembly 34 (FIG. 5). The spray nozzle assembly 34 may be configured to direct a precise amount of the lubricant 36 onto the vehicle door 26. In some embodiments, multiple spray nozzle assemblies 34 and 42 may be provided so that multiple vehicle doors 26 can be sprayed with the lubricant 36 simultaneously.

Referring to FIG. 5, the spray nozzle assembly 34 may include a linkage 44 that can connect to an overhead support structure 46 and a nozzle 48 connected to the linkage 44. The linkage 44 may be a multi-piece linkage 44 that includes a pivot joint 50 that allows for positioning of the nozzle 48 in order to spray onto a desired location on the vehicle doors 26. The fluid line 40 is operatively connected to the nozzle 48 to provide the lubricant 36 thereto.

Figure 6:
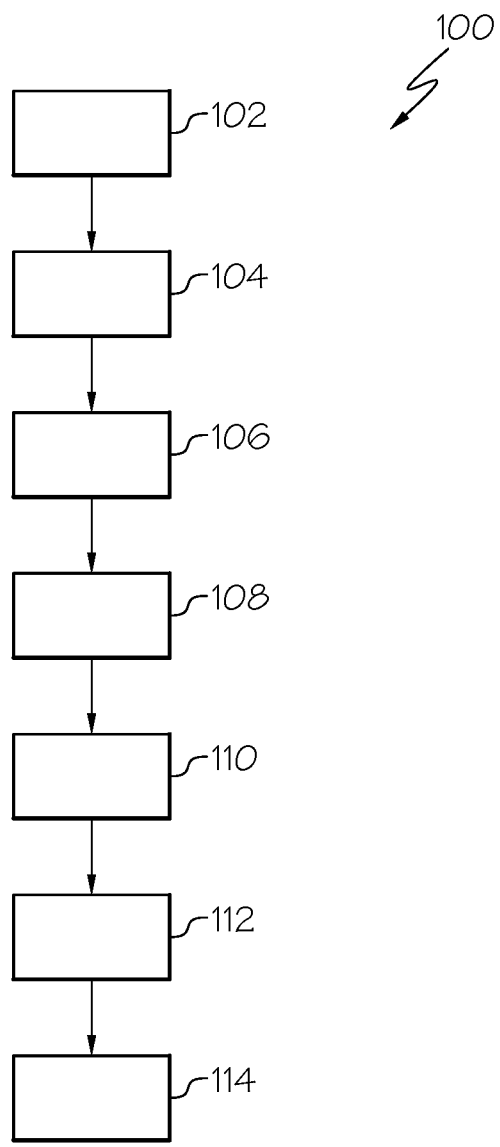
FIG. 6 schematically illustrates a method of automatically providing a lubricant to a vehicle door using the vehicle door lubrication system of FIG. 1, according to one or more embodiments shown and described herein.

Referring now to FIG. 6, a method 100 of providing lubricant automatically to a vehicle door is represented. The method 100 includes, at step 102, placing the lubricant tank 18 and the timing device 16 on the support frame 14. At step 104, the pump 22 is operatively connected to the lubricant tank 18. At step 106, the timing device 16 may be electrically connected to the pump 22 using the power line 32 for controlling operation of the pump 22. The pump 22 is fluidly connected to the spray nozzle assembly 34 using the fluid line 40 at step 108.

In operation, the vehicle door 26 is conveyer toward the sensing device 24 at step 110. At step 112, when the vehicle door 26 comes into contact with the sensing device 24, a signal is provided to the timing device 16. The timing controller 20, upon receipt of the signal, then instructs the pump 22 to activate using the power line 32 at step 114. Power may be provided to the pump 22 for a preselected period of time for spraying lubricant 36 onto the vehicle door 26. Multiple vehicle doors 26 may be sprayed simultaneously using multiple spray nozzle assemblies 34 and 42.

It should now be understood that the vehicle door lubrication systems described herein can be used to automatically spray vehicle doors with a lubricant during vehicle assembly rather than spraying vehicle doors manually. Such an automated arrangement can reduce the amount of time for the lubrication process. For example, multiple vehicle doors may be lubricated simultaneously rather than one at a time. The timing device can be used to control an amount or lubricant that is applied to the vehicle doors and can also reduce any overspray that may occur should the vehicle doors stop on the sensing device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle door lubricant application system comprising:
   a pump connected to a fluid line that is connected to a fluid reservoir of a lubricant tank, the pump configured to provide a preselected amount of a lubricant to a spray nozzle assembly, the spray nozzle assembly configured to dispense the lubricant; and
   a sensing device configured to detect presence of a vehicle door as the vehicle door is conveyed automatically using a conveyor to the sensing device, the sensing device configured to provide a signal in response to the presence of the vehicle door on the conveyor that is used to activate the pump;
   wherein the spray nozzle assembly is configured to direct the lubricant from an overhead support structure downward toward a door weather strip or glass run channel of the vehicle door that is below and spaced away from the spray nozzle assembly and overhead support structure.

2. The system of claim 1 further comprising a timing device comprising a timing controller, the timing controller configured to activate the pump upon receipt of the signal.

3. The system of claim 2, wherein the timing controller is configured to activate the pump for a preselected amount of time.

4. The system of claim 1, wherein the spray nozzle assembly is connected to the overhead support structure.

5. The system of claim 1, wherein the sensing device comprises a limit switch.

6. The system of claim 1 further comprising a lubricant tank, the lubricant tank comprising the fluid reservoir and the lubricant.

7. The system of claim 1, wherein the lubricant is water.

8. The system of claim 1, wherein the pump is fluidly connected to multiple spray nozzle assemblies.

9. A method of providing lubricant automatically to a vehicle door, the method comprising:
   conveying the vehicle door toward a sensing device automatically using a conveyor;
   sensing the presence of the vehicle door using a sensing device as the vehicle door is conveyed automatically using the conveyor to the sensing device, the sensing device providing a signal to a timing device upon detecting the presence of the vehicle door; and
   upon receipt of the signal, the timing device activating a pump, the pump providing the lubricant to a spray nozzle assembly during activation of the pump, the spray nozzle assembly spraying the lubricant onto the vehicle door;
   wherein the spray nozzle assembly directing the lubricant from an overhead support structure downward toward a door weather strip or glass run channel of the vehicle door that is below and spaced away from the spray nozzle assembly and overhead support structure.

10. The method of claim 9 further comprising the timing device activating the pump for a preselected period of time.

11. The method of claim 10, wherein the step of the pump providing the lubricant to a spray nozzle assembly comprising the pump providing the lubricant to multiple spray nozzle assemblies.

* * * * *